UNITED STATES PATENT OFFICE 2,374,876

PROCESS OF RECOVERING CARBON DIOXIDE FROM GASES

Frank Henderson May, Trona, Calif., assignor to American Potash & Chemical Corporation, Trona, Calif., a corporation of Delaware No Drawing. Application November 23, 1942, Serial No. 466,675

6 Claims. (Cl. 23—150)

This invention relates to a process of recovering carbon dioxide from gases containing the same.

In my copending application, Serial No. 460,278, filed on September 30, 1942, I have described a process for extracting carbon dioxide from gases, in which process there is employed an absorbing medium containing potassium borate material in sufficient concentration so that potassium pentaborate octohydrate ($K_2B_{10}O_{16}.8H_2O$)

will be precipitated during the steps of absorbing the carbon dioxide from the gases, and so that there will be simultaneously formed in solution potassium bicarbonate. In the process of said copending application, precipitated potassium pentaborate ($K_2B_{10}O_{16}.8H_2O$) is redissolved in the liquid component of the absorbing medium during the desorbing operations.

The process of such copending application utilizes an absorbing medium, the components of which belong to either the system: potassium, borate, carbonate, and water, or to the system: potassium, sodium, carbonate, borate, and water. The absorbing medium of the present process embraces the system: potassium, borate, carbonate, chloride, and water. Reference is also made to my copending application Serial No. 462,425, filed October 17, 1942, applications Serial Nos. 507,298, 507,299 and 507,300, filed October 22, 1943, 519,340, filed January 22, 1944, and 558,263, filed October 11, 1944.

An object of the present invention is to provide a process of recovering carbon dioxide from gases, by which process I am enabled to reduce the amount of water vapor released from the absorbing medium during the steps of boiling off the carbon dioxide therefrom. While the process of said copending application made material improvement in this respect, as compared with prior practice, the present invention constitutes an advance over both.

The process of the present invention includes three important discoveries. The first of these discoveries is that by maintaining in the absorbing medium a sufficient concentration of potassium and borate material so that potassium pentaborate will be liberated during the absorption of carbon dioxide, the acidity of the absorbing medium may be maintained at a sufficiently low value to permit absorption of greatly increased quantities of carbon dioxide without increasing the partial pressure of carbon dioxide over that occurring in usual practice.

At the start of the absorbing operations, the borate material is mainly present in the tetraborate form, i. e., with a ratio of $B_2O_3$ to $K_2O$ of 2 to 1. Throughout this work, I refer to such tetraborate as the "basic" constituent of the absorbing liquor, as it has a great affinity for the acidic gas, $CO_2$. During the absorbing operations, the tetraborate material is converted into pentaborate, in accordance with the following equation:

$$5K_2B_4O_7.4H_2O + 6CO_2 = 2K_2B_{10}O_{16}.8H_2O + 6KHCO_3 + H_2O$$
(precipitate)

In this work, I refer to the pentaborate ($K_2B_{10}O_{16}$)

as the "acid" constituent. It has a ratio of $B_2O_3$ to $K_2O$ of 5 to 1, and is formed in the process of my invention by virtue of the added acidity provided by the absorbed carbon dioxide. According to the foregoing equation, there is formed a "sludge" of carbonated liquor and precipitated potassium pentaborate octohydrate, and it is the precipitation of this acidic constituent from the solution which enables my process to proceed with a large absorption of carbon dioxide per gallon of absorbing medium.

The second basic discovery of the present invention is that the liberation of carbon dioxide from the absorbing medium may be greatly facilitated by retaining the precipitated potassium pentaborate in contact with the solution containing the absorbed carbon dioxide during the operations of boiling off the carbon dioxide therefrom. In accordance with the process of the present invention, the sludge of precipitated potassium pentaborate octohydrate and liquor is heated to boil off the absorbed carbon dioxide. During this operation, generally termed "desorption" in the art, the precipitated potassium pentaborate octohydrate goes back into solution, acidifying the solution and thereby materially aiding the liberation of the carbon dioxide.

The third discovery is that the addition of potassium chloride to the system potassium, borate, carbonate, water is of material benefit in the desorption step of the process. By supplying considerable potassium chloride to the solutions cycling in the present process, I am able to boil off carbon dioxide while simultaneously boiling off less water than in the process of my aforesaid prior application.

The process of the present invention, together with additional discoveries and advantages of the invention, should be fully understood from the following description of a preferred example of the process embodying the invention.

Since the process is a cyclic process, the description of it may begin at any point in the cycle. I will describe an example of the process embodying the present invention, commencing the description with a statement of the composition of the sludge constituting the absorbing medium obtained at the completion of the absorbing operation. Such a sludge as obtained at 35° C. contained 38.4 parts (by weight) of $K_2B_{10}O_{16}.8H_2O$ as a suspended solid per 100 parts of excess water. The accompanying solution, containing said water, comprised at 35° C. the following materials:

| | Parts by weight |
|---|---|
| $K_2B_4O_7.4H_2O$ | 19.5 |
| $K_2B_{10}O_{16}.8H_2O$ | 4.5 |
| $KHCO_3$ | 15.0 |
| $KCl$ | 15.0 |
| $H_2O$ | 100.0 |
| Total solution | 154.0 |

This solution was essentially saturated with respect to $K_2B_4O_7.4H_2O$ and, of course, fully saturated with respect to $K_2B_{10}O_{16}.8H_2O$. It should be understood that while the sludge of the foregoing composition is well adapted for use in the process of the present invention, sludges of other concentrations or densities may be employed. The quantity of the acid borate, $K_2B_{10}O_{16}.8H_2O$, provided as a suspended solid (38.4 grams/100 grams $H_2O$) was in excess of the $KHCO_3$ in solution which was to be decomposed in the subsequent desorption step. My process is flexible in this respect: less acid borate may be provided as a solid component, or even a greater excess of solid $K_2B_{10}O_{16}.8H_2O$ may be provided.

In the process, such a sludge is heated to boil off the absorbed carbon dioxide ($CO_2$). During such desorption, the solid potassium pentaborate of the sludge passes into solution at the higher temperatures, and proceeds to drive off the absorbed $CO_2$, as per the equation shown below. It will be noted that the added potassium chloride (KCl) does not enter into the reaction—albeit being effective in assisting in said description. In the instance of this particular solubility system, such added KCl may be thought of as a catalyst which makes the desorption reaction take place more easily, without itself entering into said reaction, which is:

$$2K_2B_{10}O_{16}.8H_2O + 6KHCO_3 + H_2O = 5K_2B_4O_7.4H_2O + 6CO_2$$

In boiling off carbon dioxide from absorber liquors, the cost of the product is largely determined by the quantity of water vapor that is evolved simultaneously with the carbon dioxide. Since the evolution of the concomitant but useless water vapor requires heat, it is obvious that the less water vapor liberated during desorption, the less the cost of the procedure. Such heat is generally supplied in the form of steam, and the demand for such steam in the desorption operation is generally spoken of as the steam consumption, or the heat requirements of the process. In plant practice, the provision of economizers, heat exchangers, and counter-current towers affect the total quantity of steam required to some extent, but the amount of water vapor which is liberated with the carbon dioxide nevertheless largely determines the steam or heat requirements of the process. Accordingly, I find an important factor to be considered in evaluating such a process is the ratio of water vapor to carbon dioxide liberated in the process, which ratio is, to a considerable extent, determined by the composition of the absorbing medium. In order to evaluate the composition of the absorbing medium in this respect, I, therefore, test the medium as follows:

In the test, I employ a flask fitted with a sealed agitator, a thermometer reaching to the bottom of the flask, and a connection leading to an off-side condenser, which condenser is strongly cooled. The lower end of the condenser dips into a smaller flask containing strong sulphuric acid, which is provided for receiving the condensate and for scrubbing the water vapor out of the evolved carbon dioxide gas. During the test, I place a sample of the absorber sludge in the agitated flask and apply heat both at the bottom (to cause gentle ebullition) and near the neck of the flask (to prevent condensation and reflux). Boiling is, of course, carried out at atmospheric pressure—more exactly at about 720 mm. total pressure. By careful weighing of the two flasks, before and after heating, the weight of carbon dioxide and water vapor driven off from the absorber sludge may be determined.

In the process of my invention, the carbon dioxide is liberated very easily and with very little concomitant water vapor at the start of the desorption (boiling operations). As this proceeds, the temperature of the solution rises and a greater proportion of the water vapor is expelled with the carbon dioxide gas. It is, of course, within the province of the operator of my process to choose, depending upon various practical considerations, the temperature at which he desires to carry out the boiling off operations. This is illustrated by a series of tests I have made when boiling off an absorber sludge similar to that specified in the present example.

| Final boiling temperature, ° C. | Percent of $CO_2$ (expelled at 100° C.) expelled in test | Ratio of water to $CO_2$ evolved (by weight) |
|---|---|---|
| 75 [1] | 36 | 0.17 |
| 85 | 58 | 0.19 |
| 95 | 80 | 0.31 |
| 100 | 100 | 0.75 |

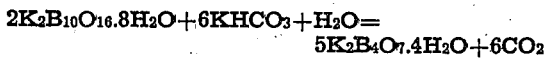
[1] All solids dissolved at 78° C.

One gallon of the foregoing absorber sludge, when desorbed at 100° C., yields approximately 0.3 pound $CO_2$. The efficacy of the added KCl may be easily seen by comparing the above data with Examples 1 and 2 of my copending application, Serial No. 460,278, filed on September 30, 1942. Despite the fact that the present absorber solution contained less absorbed $CO_2$ (expressed as $KHCO_3$) than the liquors of the two aforesaid examples (and hence should yield $CO_2$ with greater reluctance and with greater consumption of steam), heat requirement for decomposition was actually less in the present instance. In other words, whereas the examples of the prior application evolved from 0.95 to 1.16 pounds of water with each pound of $CO_2$ boiled off, the present system evolved only 0.75 pound of water per pound of $CO_2$ evolved. (All tests are comparable with respect to boiling temperatures—100° C.).

In the present desorption operation, 80 percent of the total $CO_2$ (expressed as $KHCO_3$) of the absorber discharge liquor (sludge) was decomposed, leaving a very low residual $CO_2$ ($KHCO_3$) content. It is well known that the expulsion of absorbed $CO_2$ down to low residual values is difficult—usually requiring an enormous amount of heat—liberating large quantities of water per pound of $CO_2$ evolved. The present process has done this with but very little liberation of water per pound of $CO_2$ evolved. Incidentally, since the examples of the copending application did not reduce their residual $CO_2$ ($KHCO_3$) values to so low a value, the efficacy of the present process is truly greater than is indicated by the chosen comparisons.

After liberation of the carbon dioxide in the boiling off operation, all solids are usually in solution. The hot solution is then cooled and returned to the carbonating or absorbing operation. During this cooling operation, over-saturation is reached with respect to potassium tetraborate tetrahydrate ($K_2B_4O_7.4H_2O$), and such potassium tetraborate may precipitate in some cases. I have found, however, that $K_2B_4O_7.4H_2O$ has a strong tendency to resist crystallization, so that the cooling procedure may not precipitate all or even any, $K_2B_4O_7.4H_2O$ during the cooling operation, or even upon long standing—say, for hours, or even days. This failure of $K_2B_4O_7.4H_2O$ to precipitate is not disadvantageous. In fact, it is decidedly helpful. If a large quantity of the relatively basic $K_2B_4O_7.4H_2O$ remains in the cold solution in a state of metastable supersaturation, then the solution becomes even a better absorption medium for carbon dioxide from dilute gases. The partial pressure of the cooled, supersaturated desorber liquor produced in the above example was only 9 mm. at 35° C. This extremely low value is due to a combination of said supersaturation effect, together with the absence from the solution of any appreciable quantity of residual $CO_2$, i. e., $KHCO_3$.

In the absorbing or carbonating operations, flue gases or other sources of carbon dioxide, admixed with other gases but properly prepared, may be employed. Generally, the absorbing operations are conducted countercurrent—the cold absorbing medium being introduced into the top of an absorption tower, while the gases are introduced into the bottom of the tower. During the absorbing operations, the potassium tetraborate reacts with carbon dioxide, forming potassium pentaborate. The potassium pentaborate precipitates from solution as octohydrate $$(K_2B_{10}O_{16}.8H_2O)$$

Heat is liberated in these absorbing operations and may be continuously removed in the operations to maintain the absorbing medium at the desired temperature.

In this example of my process, I employ a temperautre of 35° C. during the absorption operations. It is obvious, however, that the economical consideration of each individual plant will determine the most suitable temperature of operation. As a result of this carbonation operation, the previously described starting sludge is produced. When the absorbing operations are conducted counter-currently, the most denuded gases come into contact with the fresh absorbing medium which is best adapted to remove the carbon dioxide therefrom. Where the fresh cold absorbing medium is supersaturated with

it has even a lower $CO_2$ partial pressure than the absorption medium which has precipitated $K_2B_4O_7.4H_2O$ and is, therefore, more effective in absorbing carbon dioxide. Because of the high efficiency of the absorbing liquor when supersaturated with $K_2B_4O_7.4H_2O$ to remove carbon dioxide, it may be fed into the tower at temperatures considerably higher than the temperature at which it is to be withdrawn from the tower. During the absorption or carbonation operation, the precipitation of the acid borate ($K_2B_{10}O_{16}.8H_2O$) restrains the rise of acidity in the absorption medium and thereby permits a high absorption of carbon dioxide per gallon of absorption medium used. The partial pressure of $CO_2$ over the completely carbonated sludge at 35° C. (composition shown above) was found to be 62 millimeters of mercury. The specific gravity of the sludge was found to be about 1.3 at the same temperatures.

The advantages accruing to the present system over the pure potassium borate-carbonate system of the prior application are brought about by the presence of potassium chloride (KCl) in the potassium borate liquors. In the example quoted above, containing 15 parts KCl per 100 parts free water, the liquor was only about half saturated with respect to said KCl. It was also unsaturated with respect to $KHCO_3$, containing 15 parts per 100 $H_2O$. I have found that the presence of KCl in the system not only aids in the liberation of $CO_2$ during desorption, but also has a tendency to increase the partial pressure of $CO_2$ over the absorption liquor at lower temperatures. This effect is shown by the following table, for solutions saturated with respect to $K_2B_4O_7.4H_2O$ and $K_2B_{10}O_{16}.8H_2O$ at 35° C.

| $KHCO_3$ | KCl | $CO_2$ |
|---|---|---|
| 10 | 0 | 18 |
| 10 | 15 | 43 |
| 10 | Sat. | 70 |
| 15 | 0 | 30 |
| 15 | 15 | 62 |
| 15 | Sat. | 103 |
| 20 | 0 | 50 |
| 20 | 15 | 88 |
| 20 | Sat. | 138 |

In this table, "$KHCO_3$" and "KCl" represent the concentrations of these constituents expressed as before, i. e., as parts by weight per 100 parts of free water. The partial pressure of $CO_2$ over the solutions, "$CO_2$," is expressed in millimeters of mercury. The abbreviation "Sat." means saturated, and represents KCl concentrations varying from 35 to 31 parts per 100 parts water.

From these data it may be seen that, for a fixed, allowable, or desired partial pressure of $CO_2$ over the absorber sludge, a variety of combinations of KCl and $KHCO_3$ concentrations are available to the operator of my process. I prefer to have in the solution considerable KCl to catalytically assist in the desorption reaction, but it may be necessary at times to compromise with that desideratum, in deference to the desired $CO_2$ partial pressure over the cold absorbing liquor and to the desired per gallon yield therefrom. For instance, if absorption conditions allow of use of a $CO_2$ partial pressure of only 70 mm. at 35° C. in the finished absorber sludge, then I can absorb $CO_2$ only to the point represented by 10 parts per 100 of $KHCO_3$ in the solution, if said solution be saturated with respect to KCl. On the other hand, by limiting the KCl concentration to about 20 parts per 100 $H_2O$, about 15 parts $KHCO_3$ can be carried in the absorber liquor without exceeding the "fixed" $CO_2$ partial pressure of 70 mm. By further reducing the KCl content to 10 parts per 100 $H_2O$, about 20 parts $KHCO_3$ (absorbed $CO_2$) can be carried in the absorber liquor at the aforesaid 70 mm. $CO_2$ pressure. While an exact evalution of the problem involves many economic factors, which must be determined in "the field," as it were, I generally prefer to operate with my absorption liquors containing from 10 to 20 parts KCl per 100 $H_2O$. Under such "compromise" good absorption, as well as economical desorption (boiling off), can be obtained, together with high per-gallon yields.

I have mentioned the tendency of the desorber liquor to become supersaturated upon cooling with respect to the alkaline borate $(K_2B_4O_7.4H_2O)$ and have indicated that such a phenomenon is not disadvantageous. I have also found that the acidic borate $(K_2B_{10}O_{16}.8H_2O)$ may be sluggish in precipitating during carbonation. This is definitely undesirable and the operator should take steps to avoid the same. This can be accomplished by good agitation during carbonation, or by seeding with $K_2B_{10}O_{16}.8H_2O$, or by both methods. Usually, in a continuous process, once established, little trouble is encountered on this score.

It should be appreciated that the foregoing example was selected to illustrate fundamental features of my invention. In commercial practice, satisfactory results may be achieved while departing somewhat from the conditions specified; in particular, although I have chosen an example wherein the solution comprising a portion of the sludge at the end of the carbonation operation was just saturated with potassium tetraborate, some under-saturation or over-saturation with respect to this material may be tolerated in practice.

I claim:

1. A cyclic process for recovering carbon dioxide from gases which comprises producing a sludge containing solid potassium pentaborate octohydrate and a solution of potassium borates, bicarbonate and chloride, heating said sludge to dissolve the suspended solids and to react potassium pentaborate with potassium bicarbonate to evolve carbon dioxide gas, thereafter cooling the resulting solution, and contacting said cold solution with gases to absorb carbon dioxide and to again produce a sludge similar to that present at the start of the cycle.

2. A cyclic process for recovering carbon dioxide from gases which comprises producing a sludge containing solid potassium pentaborate octohydrate and a solution of potassium borates, bicarbonate and chloride, said solution being substantially saturated with potassium tetraborate tetrahydrate, heating said sludge to dissolve the solids and to react potassium petaborate with potassium bicarbonate to evolve carbon dioxide gas, thereafter cooling the resulting solution, and contacting said cold solution with gases to absorb carbon dioxide and to again produce a sludge similar to that present at the start of the cycle.

3. A cyclic process for recovering carbon dioxide from gases which comprises producing a sludge containing solid potassium pentaborate octohydrate and a solution of potassium borates, bicarbonate and chloride, said solution being substantially saturated with potassium tetraborate tetrahydrate, heating said sludge to dissolve the solids and to react potassium pentaborate with potassium bicarbonate to evolve carbon dioxide gas, thereafter cooling the solution resulting from the heating operation to render it metastably supersaturated with respect to potassium tetraborate tetrahydrate, and contacting said solution with gases to absorb carbon dioxide, said absorption being continued with the precipitation of potassium pentaborate octohydrate until the cold sludge no longer contains potassium tetraborate tetrahydrate in excess of normal solubility values, to again produce a sludge similar to that present at the start of the cycle.

4. A cyclic process for recovering carbon dioxide from gases which comprises producing a sludge containing solid potassium pentaborate octohydrate and a solution of potassium borates, said solution having a partial pressure of carbon dioxide not to exceed 70 mm. Hg at 35° C. and containing from 10 to 35 grams of potassium chloride per 100 grams of excess water, and containing 20 to 10 grams of potassium bicarbonate per 100 grams of excess water, said solution being substantially saturated with potassium tetraborate tetrahydrate, heating said sludge to dissolve the solids and to react potassium pentaborate with potassium bicarbonate to evolve carbon dioxide gas, thereafter cooling the resulting solution, and contacting said cold solution with gases to absorb carbon dioxide and to again produce a sludge similar to that present at the start of the cycle.

5. A cyclic process for recovering carbon dioxide from gases which comprises producing a sludge containing solid potassium pentaborate octohydrate and a solution of potassium borates, bicarbonate and chloride, heating said sludge to dissolve the suspended solids and to react potassium bicarbonate with potassium pentaborate to evolve carbon dioxide, the quantity of solid, suspended, potassium pentaborate octohydrate present at the start of the cycle being in excess of the amount needed to produce said evolved carbon dioxide, thereafter cooling the solution resulting from the heating operation, and contacting said cold solution with gases from which carbon dioxide is to be extracted, to absorb carbon dioxide and to again produce a sludge similar to that present at the start of the cycle.

6. A cyclic process for recovering carbon dioxide from gases which comprises producing a sludge containing solid potassium pentaborate octohydrate and a solution of potassium borates, bicarbonate and chloride, said solution being substantially saturated with potassium chloride, heating said sludge to dissolve the solids and to react potassium pentaborate with potassium bicarbonate to evolve carbon dioxide gas, thereafter cooling the solution resulting from the heating operation, and contacting said cold solution with gases to absorb carbon dioxide and to again produce a sludge similar to that present at the start of the cycle.

FRANK HENDERSON MAY.